Jan. 9, 1962  J. E. DOVE  3,015,958

MULTI-DIRECTIONAL ACCELEROMETER

Filed Dec. 31, 1959  4 Sheets-Sheet 1

Jack E. Dove,
INVENTOR.

BY S. J. Rotondi,
A. T. Dupont, and
Alvin E. Moore,
ATTORNEYS.

Jan. 9, 1962   J. E. DOVE   3,015,958
MULTI-DIRECTIONAL ACCELEROMETER
Filed Dec. 31, 1959   4 Sheets-Sheet 2

Jack E. Dove,
INVENTOR.

BY S. J. Rotondi,
A. T. Dupont, and
Alvin E. Moore,
ATTORNEYS.

Jan. 9, 1962  J. E. DOVE  3,015,958
MULTI-DIRECTIONAL ACCELEROMETER

Filed Dec. 31, 1959  4 Sheets-Sheet 3

Jack E. Dove
*INVENTOR.*

BY S. J. Rotondi,
A. T. Dupont, and
Alvin E. Moore,

ATTORNEYS.

Jan. 9, 1962 J. E. DOVE 3,015,958
MULTI-DIRECTIONAL ACCELEROMETER
Filed Dec. 31, 1959 4 Sheets-Sheet 4

Jack E. Dove,
*INVENTOR.*
BY S. J. Rotondi,
A. T. Dupont, and
Alvin E. Moore,
ATTORNEYS.

United States Patent Office 3,015,958
Patented Jan. 9, 1962

3,015,958
MULTI-DIRECTIONAL ACCELEROMETER
Jack E. Dove, 9715A Redstone Park, Huntsville, Ala.
Filed Dec. 31, 1959, Ser. No. 863,369
7 Claims. (Cl. 73—516)
(Granted under Title 35, U.S. Code (1952), sec. 266)

The invention described herein may be manufactured and used by or for the Government for governmental purposes without the payment of any royalty thereon.

This invention relates to a multi-directional accelerometer. Such an accelerometer provides means for measuring multi-directional accelerations, shocks, and vibrations on tested components.

In subjecting missiles, aircraft, or other elements to peaks of acceleration, shock or vibration in flight, or in testing, there is a need for an accelerometer which will provide signals indicating true representations of vectors of the various acceleration forces without overriding tendencies, enabling any two of these vectors in combination to produce a signal indicating a force in the direction of their resultant. There is also a need for an accelerometer which will provide signals that are true representations of a multiple of different resultants of this type, and combine these resultants (as vectors) in a final resultant which indicates the direction of various combined forces producing accelerations. There are other needs for accelerometers that will provide signals that are true representations of single or multiple nonsinusoidal oscillations and that will provide signals that are true representations of single or multiple shocks of various amplitudes.

In view of these facts, an object of this invention is to provide a multi-directional accelerometer which eliminates overriding tendencies.

Another object of this invention is to provide an accelerometer which will present true signal representations of a multiple of different resultants, and combine these resultants into a single resultant which indicates the resultant direction of the combined forces producing accelerations.

Another object is to provide an accelerometer which will provide true signal representations of single or multiple nonsinusoidal oscillations.

A further object is to provide an accelerometer which will provide true signal representations of a single shock or multiple shocks of various amplitudes.

A still further object is to provide an accelerometer which will not be damaged by high accelerations and which will provide undistorted measurements for these high accelerations.

The foregoing and other objects of this invention will become more fully apparent from the following detailed description and from the accompanying drawings, in which.

Figure 1:
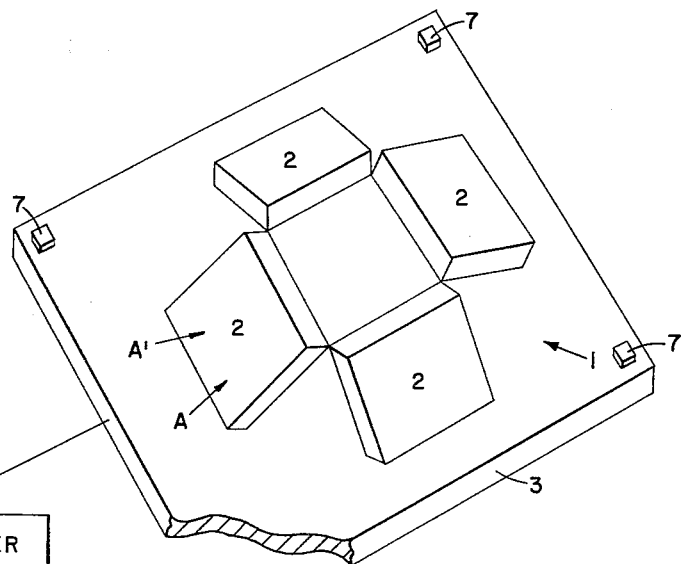
FIGURE 1 is a perspective view, partly broken away, showing the arrangement of the units forming the accelerometer.
Figure 2:
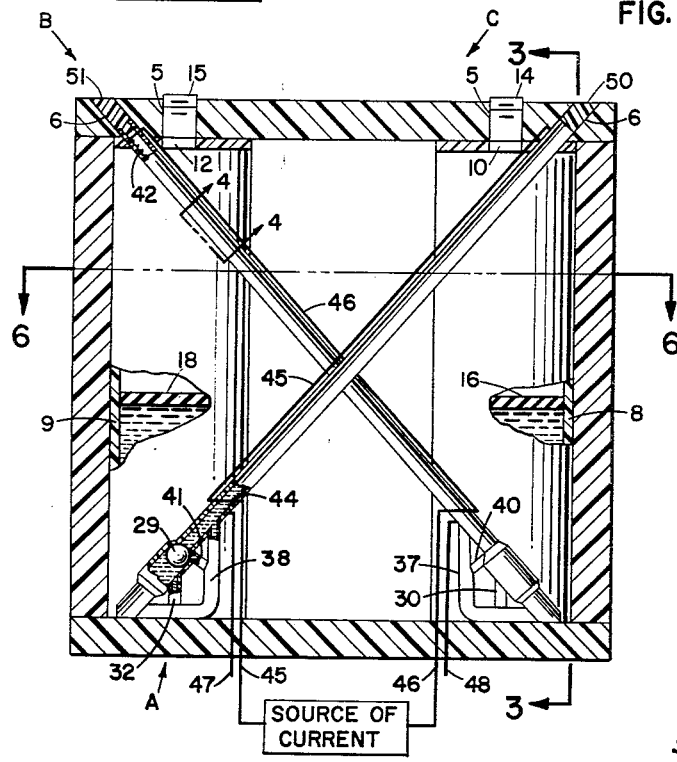
FIGURE 2 is a sectional view, partly broken away and with one side removed, of one of the units of FIGURE 1.

In the drawings, wherein for the purpose of illustration there are shown preferred embodiments of the invention, the numeral 1 designates an accelerometer comprising a plurality of units 2 secured to a base 3.

Base plate 3 is held level, as on a device being tested, or a ground vehicle; or is supported on a stabilized missile guidance platform by means of bolts 7. If used on such a platform in a location subject to gravity the base plate must be maintained level, but if such a location involves weightlessness, the base plate may be stabilized in space, as by means of gyroscope. Thus plate or support 3 is stabilized relative to a reference plane, which in the case of the support being level is the equational plane of the earth and in the case where the support is stabilized relative to space is a plane in the solar system.

Figure 3:
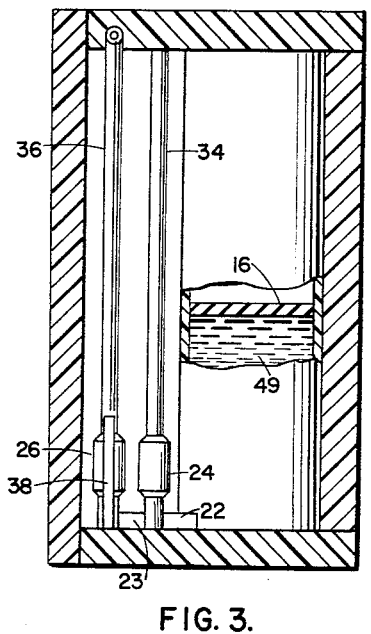
FIGURE 3 is a sectional end view, partly broken away, along the plane 3—3 of FIGURE 2.

Each of the units of the embodiment of FIGURES 1 to 6 has the same structure, being rectangular, and as shown in FIGURE 3 is provided with a removable side 4. The unit is hollow and is made of nonconducting material, such as plastic, which may be reinforced by fiberglass. The unit has a pair of screw-threaded vertical apertures 5 and a pair of angled apertures 6 in its upper end.

A pair of reservoirs 8 and 9 having screwthreaded apertures 10 and 12 respectively, in their upper ends, are positioned inside the hollow portion of each unit, so that apertures 10 and 12 are aligned with apertures 5. The reservoirs are secured in aligned position with apertures 5 by a pair of pneumatic valves 14 and 15, which are screwed into apertures 5 and into apertures 10 and 12. Reservoirs 8 and 9 have a pair of flexible diaphragms 16 and 18 respectively, engaging their internal walls with a tight fit.

The other ends of reservoirs 8 and 9 contain apertures 20 and 21, which are connected with one pair of ends of tubular members 22 and 23, respectively, having substantially the same cross-sectional area as apertures 20 and 21. The other pair of ends of members 22 and 23 are flow-connected to the base of mercury-containing channels or tubes 34 and 36, which also have substantially the same cross-sectional area as members 22 and 23.

The channels have an enlarged portion 24 and 26 juxtaposed their base. The ends of the enlarged portions form a seat for buoyant, dielectric balls 28 and 29. These balls remain in the upper seat until a force, large enough to unseat them, moves them to the lower seat. The channels and the ends of members 22 and 23, connected to the channels, are joined by one end of tubular members 37 and 38. The other end of members 37 and 38, which is smaller than the first-named end, is connected to channels 34 and 36 above the enlarged portions. Members 37 and 38 are also flow-connected to the enlarged portions, at a point located above the center of the balls, by angled members 40 and 41 and near the center of the enlarged portions of channels 34 and 36 by flow tubes 30 and 32.

Figure 4A:
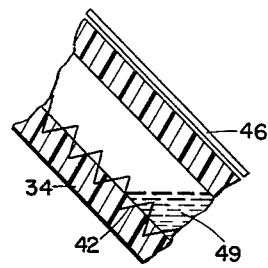
FIGURE 4A is an enlarged view in longitudinal section of one of the mercury channels, indicated by line 4—4 of FIGURE 2, showing the arrangement of the resistors.
Figure 4B:
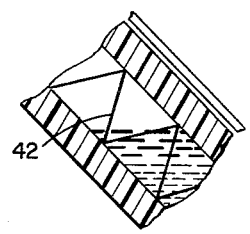
FIGURE 4B is a sectional detail view of another arrangement of the resistance coil.
Figure 6:
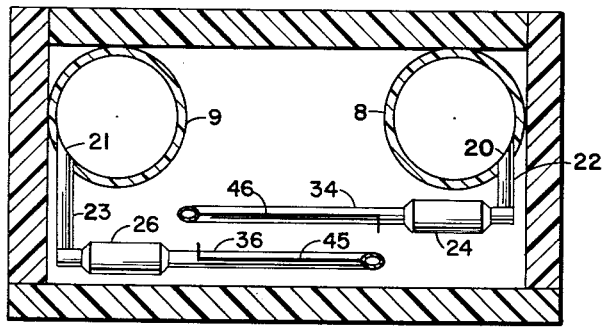
FIGURE 6 is a sectional view along the plane 6—6 of FIGURE 2.

Channels 34 and 36 are of non-conducting material, and have equal resistors 42 and 44, which when not bypassed by mercury, supply equal signals to computer 43. Conductors 45 and 46 are fastened to the outside walls of the channels. The resistance coils of the type shown in FIGURE 4A are halfway embedded in the non-conducting material of the tube walls; but, as shown in FIGURE 4B larger coils may be utilized, which are not thus embedded. The conductors are joined to the resistors at the inside of the channels, near apertures 6. A second pair of conductors 47 and 48 are connected to the ends of the resistors, opposite from apertures 6. Conductors 45 to 48 are extended thru the wall of the unit, where they are attached to computer 43. Each circuit thru the mercury and resistors is completed, in known manner, by an electrical load device that is either in the computer or alternatively adjacent to the computer, before the signal enters the computer. In the computer the two signals indicating two accelerations, such as A and B, are integrated in known manner, and the computer supplies a control signal representing the resultant of the two accelerations to an indicator or to the control mechanism of a missile or other vehicle that is being automatically directed.

The other ends of channels 34 and 36 are fitted in the angled apertures 6, and channels 34 and 36, enlarged portions 24 and 26, members 22, 23, 30, 32, 37, 38, 40, 41 and reservoirs 8 and 9 are partially filled with mercury 49.

When the mercury reaches the desired height in the reservoirs, the ends of the channels are closed by removable plugs 50 and 51, and the parts of the reservoirs above diaphragms 16 and 18 are equally pressurized with air, or other gas supplied thru valves 14 and 15, so as to maintain equal heads of mercury in the channels and reservoirs. This equalizes the resistance values of the mercury in the various channels before plate 3 is subjected to accelerations.

The operation of the device is as follows:

The units are mounted on base 3, which is secured in a missile or other device that is to be subjected to accelerations. The units are electrically connected to computer 43, and the missile or element is subjected to accelerations.

With plate 3 maintained in a level position, and no acceleration on it other than that of gravity, the head of mercury in reservoir 8 (or 9) on one hand and the head in each of the inclined tubes 34 and 36 on the other hand are level.

If an acceleration of plate 3 in the direction of arrow A, which is parallel to one of units 2, occurs, mercury lags, relative to the plate, in reservoirs 8 and 9 and also in all the inclined channels 34 and 36 except the two that are in a plane perpendicular to arrow A. The mercury in each tank (excepting those tanks in the unit perpendicular to A) thus moves downward in an effective or quasi column (in the tank) that is parallel to A, and has a diameter equal to the outlet (20 or 21, FIGURE 6) from the tank; and simultaneously the mercury in each connected inclined tube (34 or 36) also moves downward; and the two forces in the tank and in each of the tubes oppose each other at point $a$. One of said two forces (the one of the effective column in the tank) is larger, due to the fact that the mercury's force (mass times the acceleration) in the quasi or effective column in the tank is exerted along a line that is parallel to the acceleration (without being broken down into components), whereas the mercury's force in each of the other columns is resolved into components, and it is one of these components (along the line of the center of the tube) that, at point $a$, opposes the full force of the mercury in the quasi column. Since the force of mercury from the tank is larger than the force of mercury from the column and the enlarged portion (at point $a$) the mercury from the tank will exert more pressure on the bottom of the ball (than the mercury in the column exerts on the top of the ball) maintaining the ball on its upper seat. However, due to tube 37 and member 40 creating a path above the ball, the larger force of mercury (from the tank) will follow this path thereby reducing the pressure in tubes 24 and 30. With this pressure reduction, the mercury striking the upper section of the ball is sufficient to remove the ball from its seat. Therefore the mercury rises in the two inclined tubes in the unit 2 that is parallel to arrow A by amounts that are factors in measuring the acceleration. These two amounts are equal in the case of acceleration A, because the line of A makes equal angles with the two inclined tubes of the unit 2 that so far has been considered in this analysis; but with all other accelerations the amounts are unequal, and provide for unequal signals to the computer. The mercury in the tubes in two other units 2 also rises but with a displacement of mercury that is less than the displacement of mercury in the tubes that are parallel to A, because these two units are not parallel to A. Thus three of the units are sending signals to the computer, where they are integrated, in known manner, according to mathematical calculations to exactly indicate the amount and direction of acceleration A, by an output signal from the computer.

The signal to the computer from each tube (34 or 36) arises because of the bypassing of some of the resistance of the resistor (42 or 44) by means of the rising mercury. Thus the voltage of the signal coming from the accelerometer is increased and the current decreased.

If acceleration A is not parallel to the major axis of reservoirs 8 and 9 (for example, as indicated at A'), the same general type of force and movement of the mercury occurs. However, in this case the force that (in each tube) opposes the force in the quasi column in the tank is less, being a component of a component, due to the angles between A' and the tubes.

Although the accelerometer just described will function accurately for relatively small accelerations, the system is subject to physical and accuracy damage from shock when the acceleration is very large. This effect of such high shocks is obviated by this invention.

Since the maximum shock condition in the system occurs when the shock is propagated parallel to the response channel (34 or 36) in either direction, this parallel-acceleration response will be described.

Figure 5:
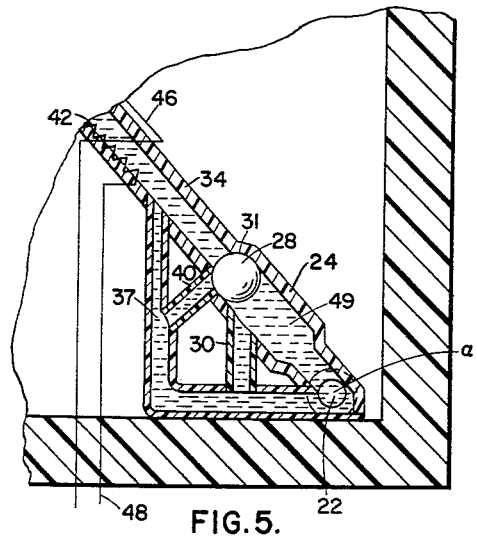
FIGURE 5 is an enlarged view showing the arrangement of the check valve structure used in FIGURE 2.

Considering FIGURE 5, let us consider a shock applied to the lower right end of channel 34 below the captive bouyant ball chamber (at point $\alpha$) and moving in an upward direction that is parallel to the center line of the channel. The reactionary response of the fluid in the channel being equal and opposite the fluid would attempt to move down through the cap'ive bouyant ball chamber toward the lower right-hand end of the responsive channel.

Shocks of a low-order would encounter only a partial restriction to the initial shock wave. This, however, is below the pressure level for which the captive bouyant ball chamber is designed. (For convenience of illustration chamber 24 is shown as longer than it would be in practice.)

A high-order shock wave, for which the cross-sectional area and volume of this chamber are designed, causes the captive bouyant ball to move to the seat at the lower right end of chamber 24—with the initial reactive response. This movement is due to the fact that the surge of mercury from the tank past point $a$ causes a sudden pressure rise thru the tubular member 37 into the tube (34, in FIGURE 5) and thru tubular member 40 into the upper end of chamber 24. This pressure forces ball 28 downward. Since a shock is like an oscillation in that the shock is one sharp reaction and the oscillation is a series of sharp responses, the bouyant ball then immediately leaves the lower seat to which it has been pushed by the initial shock reaction, and it floats to the upper seat. This permits the fluid flow in the system to range between normal heavy to normal light.

The rush of the captive bouyant ball to the lower seat therefore causes the fluid and the structure to absorb that portion of the shock wave that would develop an override condition in the fluid. When the initial shock reaction has passed through the fluid in the ball chamber the ball is at the lower end of the chamber and at the time of its seating or shortly thereafter, the initial shock wave passes out of the instrument. Thus the mass of mercury in the unbalanced head (caused by the difference in head levels in reservoir 8 and tube 34) still is in motion through the restricting channels 30 and 37; but this motion is now without the jolting impact of the initial high shock wave of the acceleration.

This initial high-order shock wave (which tends to prevent an accurate indication of the high acceleration that is involved in this use of the system) is thus prevented from distorting the acceleration measurement or damaging the accelerometer.

If, on the other hand, a high-order shock is moving downward in a direction that is parallel to the center line of channel 34, the mercury in 34 surges upward. Two vacuums thus are quickly formed on two sides of ball 28. Above the ball there is a relatively small vacuum which is proportional to the volume of the column of mercury in the portion of tube 34 which is above the ball. On the other side of the ball a vacuum is formed, at point α, that is portional to the effective, quasi column of mercury extending from this point upward to the head of mercury in reservoir 8. Since this quasi column is of larger diameter and longer than the column above the ball the lower vacuum on the ball is greater than the upper one. Hence, the ball momentarily is drawn downward from its seat. It then quickly engages the lower seat, while the chamber and its connected bypasses 30 and 40 absorb the worst of the shock. As soon as the pressure is nearly enough equalized on the opposite sides of the ball it floats back to its upper seat.

Figure 7:
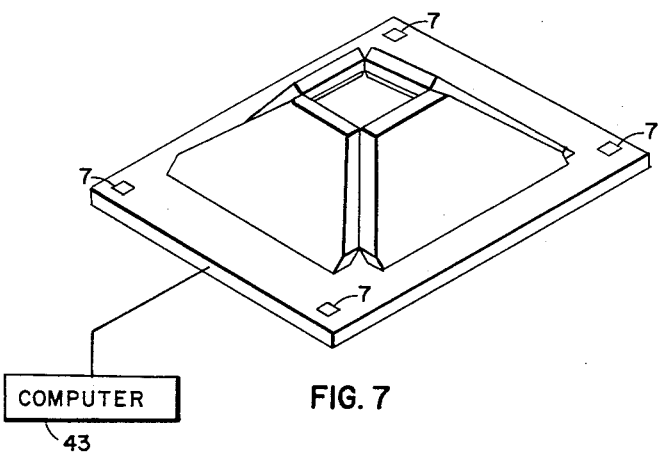
FIGURE 7 is a perspective view of another embodiment of the invention.
Figure 8:
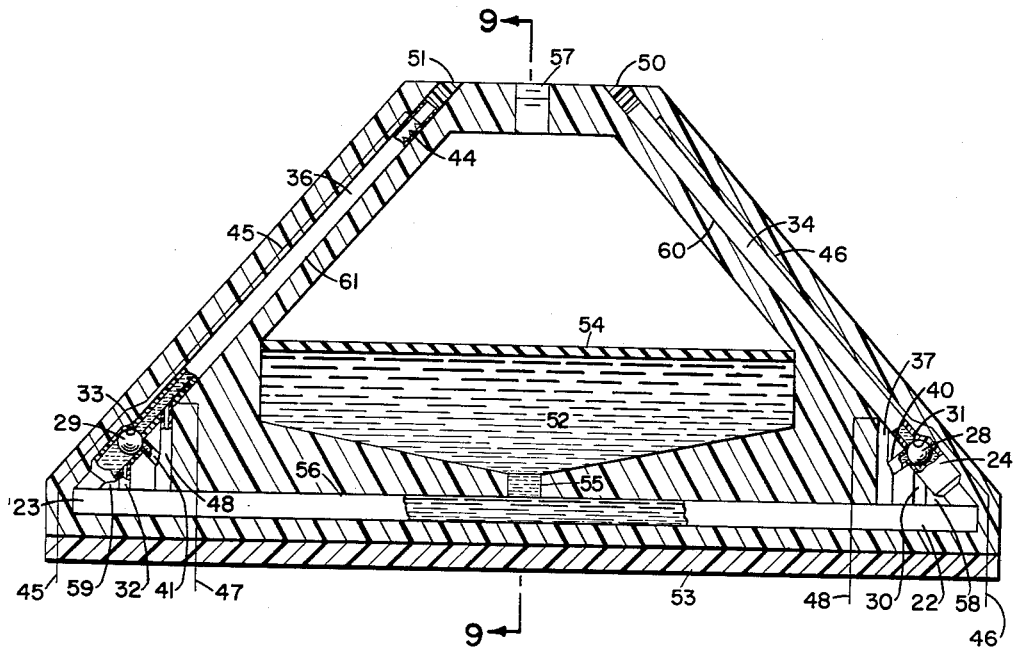
FIGURE 8 is a sectional view, partly broken away, of one of the units used in FIGURE 7.
Figure 9:
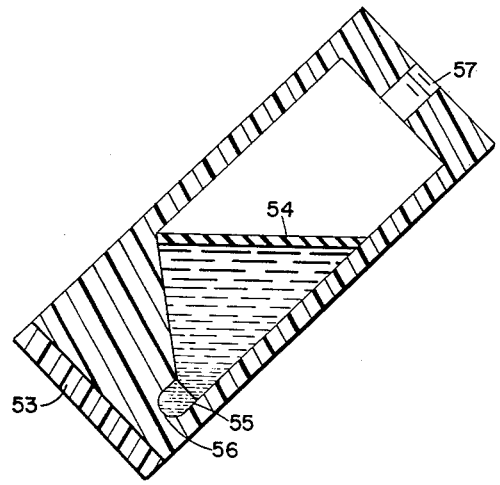
FIGURE 9 is a sectional view along the plane 9—9 of FIGURE 8.

In the embodiment shown in FIGURES 7 to 9, a different reservoir arrangement is used and the shape of the units is changed. Each unit contains a removable base plate 53, a reservoir 52 with only one pneumatic valve 57 and a flexible diaphragm 54 fixed in the reservoir. The base of the reservoir is connected by conduit 55 to the middle of a tubular member 56. One end of member 56 is attached to tubular member 22 and the other end attached to tubular member 23. The remaining connections in the transmission section, including the channels and the connections thereto, are the same as the first embodiment and the common parts are indicated by the same reference numerals.

The channels or tubes, 34 and 36, are positioned in hollow sections 58 and 59 and are secured in bores 60 and 61 after removing the base plate. The mercury is added and the reservoir pressurized as described in the first embodiment.

The operation of this embodiment is as follows:

The accelerometer is mounted in the same manner as the first embodiment and subjected to acceleration, vibration or shock, which create the same action on the mercury heads as the first embodiment, except that the mercury heads in the channels are affected by only one main reservoir.

An acceleration of the base plate 53 causes a lag relative to the plate of the mercury in reservoir 52. This lag causes a change in the pressure of the mercury at 55 and in tubular members 56. On the other hand, the same acceleration affects the smaller volumes of mercury in the inclined channels or tubes, 34 and 36, so that the mercury in said tubes tends to move relative to base plate 53, in a direction which produces forces opposite to those at the outer ends of tubes 56. These counteracting forces in channels 34 and 36 vary in accordance with the direction of the acceleration, being greater in the case of a channel that is aligned with the acceleration. Thus the heads of mercury are different in different channels, with corresponding changes in signals to the computer. These differences are a measure of the acceleration.

It is to be understood that the reservoirs 8 and 9 could be connected directly to channels 34 and 36 thereby, eliminating the enlarged portions, the surge valves and other connections (30, 32, 37, 38, 40 and 41). However, the resulting accelerometer would not be as accurate as one containing the above parts.

The forms of the invention herein shown and described are preferred embodiments, and various changes in the shape, size, and arrangement of parts may be resorted to without departing from the spirit of the invention, or the scope of the subjoined claims.

The following invention is claimed:

1. An accelerometer comprising: a support; means for maintaining a base plane of said support in a constant position relative to a reference plane; a plurality of hollow casings having axes that are joined in a vertex spaced from said base plane and that are inclined to said base plane and to each other, each of said casings being fixed at one end to said support and at its other end to another of said casings; fluid reservoir means in each casing rigidly supported relative to said support, having port means adjacent said support; a supply of acceleration-responsive mercury partially filling said reservoir means, and in communication with said port; a mercury-containing tube in each casing, said tube being located at an angle to said reservoir means, being smaller in cross section than said reservoir means and of a volume that is smaller than the volume of said reservoir means, having a base portion that is in communication with said port means, each tube being partially filled with mercury and having a hollow space extending toward said vertex from the head of said mercury in said tube whereby in the absence of an acceleration to be measured the flow-connected heads of mercury in said tube and said reservoir means are balanced and stabilized; an electrical resistance in each tube, part of which is in contact with said mercury, said resistance extending from said mercury into said hollow space and toward said vertex; a source of electric current; electrical conductors forming a circuit with said source of current and each of said resistances; whereby when said support receives an acceleration to be measured said heads of mercury in a plurality of said tubes are changed in level and the lengths of a plurality of said resistances that are electrically bypassed by said mercury changes, thus altering the electrical signals from a plurality of said circuits, said signals in combination indicating the magnitude and direction of a measured acceleration.

2. A device as set forth in claim 1, which further comprises means to supply compressed gas to the spaces within said reservoir means and tubes that are not filled with mercury.

3. A device as set forth in claim 1, in which said fluid reservoir means is a single reservoir and said port means comprises a port in communication with each of said tube base portions.

4. A device as set forth in claim 1, in which said fluid reservoir means comprises a reservoir in each of said casings, having a port in communication with one of said tube base portions.

5. A device as set forth in claim 3, which further comprises a second reservoir in each casing a second tube in each casing that is in flow-communication with said second reservoir, and a second resistance in each of said second tubes, said second tubes being inclined relative to each other.

6. A device as set forth in claim 1, which further comprises an anti-shock means having one end flow-connected to the base portion of each of said tubes and the other end flow-connected to said reservoir, comprising a chamber of larger cross-sectional area that the space within the portion of said tube to which it is connected, a valve in said chamber comprising a valve seat within said chamber adjacent said tube and a buoyant ball normally seated on said seat, a mercury-containing, bypass channel flow-connected at one of its ends to said tube on one side of said ball and flow-connected to said port on the other side of said ball, said ball being forced off said seat by a shock wave of a predetermined intensity in the mercury in said tube and bypass channel.

7. A device as set forth in claim 6, which further comprises a cross channel extending from said bypass channel to the opening thru said seat, a portion of said ball normally closing said cross channel.

References Cited in the file of this patent

UNITED STATES PATENTS

| | | |
|---|---|---|
| 1,317,072 | Carlier | Sept. 23, 1919 |
| 2,386,777 | Bentley | Oct. 16, 1945 |
| 2,441,162 | McPherson | May 11, 1948 |

FOREIGN PATENTS

| | | |
|---|---|---|
| 347,808 | Great Britain | May 7, 1931 |